United States Patent
Fang (10) Patent No.: US 11,937,134 B1
(45) Date of Patent: Mar. 19, 2024

(54) WIRELESS COMMUNICATION SERVICE USING MULTIPLE RADIO ACCESS TECHNOLOGY (RAT) TYPES

(71) Applicant: T-MOBILE INNOVATIONS LLC, Overland Park, KS (US)

(72) Inventor: Zheng Fang, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 389 days.

(21) Appl. No.: 16/530,822

(22) Filed: Aug. 2, 2019

(51) Int. Cl.
*H04W 36/00* (2009.01)
*H04W 36/14* (2009.01)
*H04W 88/06* (2009.01)

(52) U.S. Cl.
CPC ....... *H04W 36/0069* (2018.08); *H04W 36/14* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,907,559 B2 | 3/2011 | Fodor et al. | |
| 8,346,315 B2 | 1/2013 | Lindoff et al. | |
| 8,417,242 B2 | 4/2013 | Cormier et al. | |
| 8,842,633 B2 | 9/2014 | Dwyer et al. | |
| 9,295,092 B2 | 3/2016 | Kaur et al. | |
| 9,445,334 B2 | 9/2016 | Tinnakornsrisuphap et al. | |
| 9,474,006 B2 | 10/2016 | Pani et al. | |
| 9,706,522 B2 | 7/2017 | Etemad et al. | |
| 2018/0368153 A1 | 12/2018 | Li et al. | |
| 2018/0368199 A1 | 12/2018 | Zeng et al. | |
| 2019/0069325 A1 | 2/2019 | Yerramalli et al. | |
| 2019/0319814 A1* | 10/2019 | Das | H04L 43/08 |
| 2019/0364492 A1* | 11/2019 | Azizi | H04W 52/0264 |
| 2020/0296653 A1* | 9/2020 | Huang | H04W 40/24 |

* cited by examiner

*Primary Examiner* — Willie J Daniel, Jr.

(57) ABSTRACT

A wireless access node indicates available Radio Access Technology (RAT) types to a User Equipment (UE). The UE selects from the available RAT types and indicates the UE-selected RAT types to the wireless access node. The wireless access node transfers the UE-selected RAT types to a network controller. The network controller selects from the UE-selected RAT types and indicates the network-selected RAT types for the UE to the wireless access node. The wireless access node indicates the network-selected RAT types to the UE. In response, the UE and the wireless access node simultaneously exchange user data using the network-selected RAT types.

18 Claims, 10 Drawing Sheets

WIRELESS COMMUNICATION SERVICE USING MULTIPLE RADIO ACCESS TECHNOLOGY (RAT) TYPES

TECHNICAL BACKGROUND

Wireless communication networks provide wireless data services to wireless user devices. Exemplary wireless data services include voice-calling, internet-access, media-streaming, machine communications, vehicle control, and social-networking. Exemplary wireless user devices comprise phones, computers, vehicles, robots, sensors, and drones. The wireless communication networks have wireless access nodes that exchange wireless signals with the wireless user devices to facilitate the wireless data services. The type of wireless technology that is used to exchange the wireless signals is referred to as the Radio Access Technology (RAT) type. Exemplary RAT types comprise Institute of Electronic and Electrical Engineers (IEEE) 802.11 (WIFI), Long Term Evolution (LTE), Fifth Generation New Radio (5GNR), and Narrowband Internet-of-Things (NB IoT). WIFI is described in IEEE 802.11. LTE is described in Third Generation Partnership Project (3GPP) Technical Specification (TS) 36. 5GNR is described in 3GPP TS 38. NB IoT is described in 3GPP Release 13.

The wireless user devices and wireless access nodes may use multiple RAT types simultaneously. For example, smart phones use both LTE and WIFI. Low-power sensors use both NB-IoT and WIFI. New computers use WIFI, LTE, and 5GNR at the same time. Although the wireless communication networks use multiple RAT types, the selection of RAT types for an individual wireless user is not effective. For example, the simultaneous use of LTE and 5GNR is based on the selected Quality-of-Service level while the simultaneous use of LTE and WIFI is based on user WIFI control.

TECHNICAL OVERVIEW

A wireless access node indicates available Radio Access Technology (RAT) types to a wireless User Equipment (UE). The wireless UE selects from the available RAT types and indicates its UE-selected RAT types to the wireless access node. The wireless access node transfers the UE-selected RAT types to a network controller. The network controller selects from the UE-selected RAT types and indicates the network-selected RAT types to the wireless access node. The wireless access node indicates the network-selected RAT types to the UE. In response, the UE and the wireless access node simultaneously exchange user data using the network-selected RAT types.

DETAILED DESCRIPTION

Figure 1:
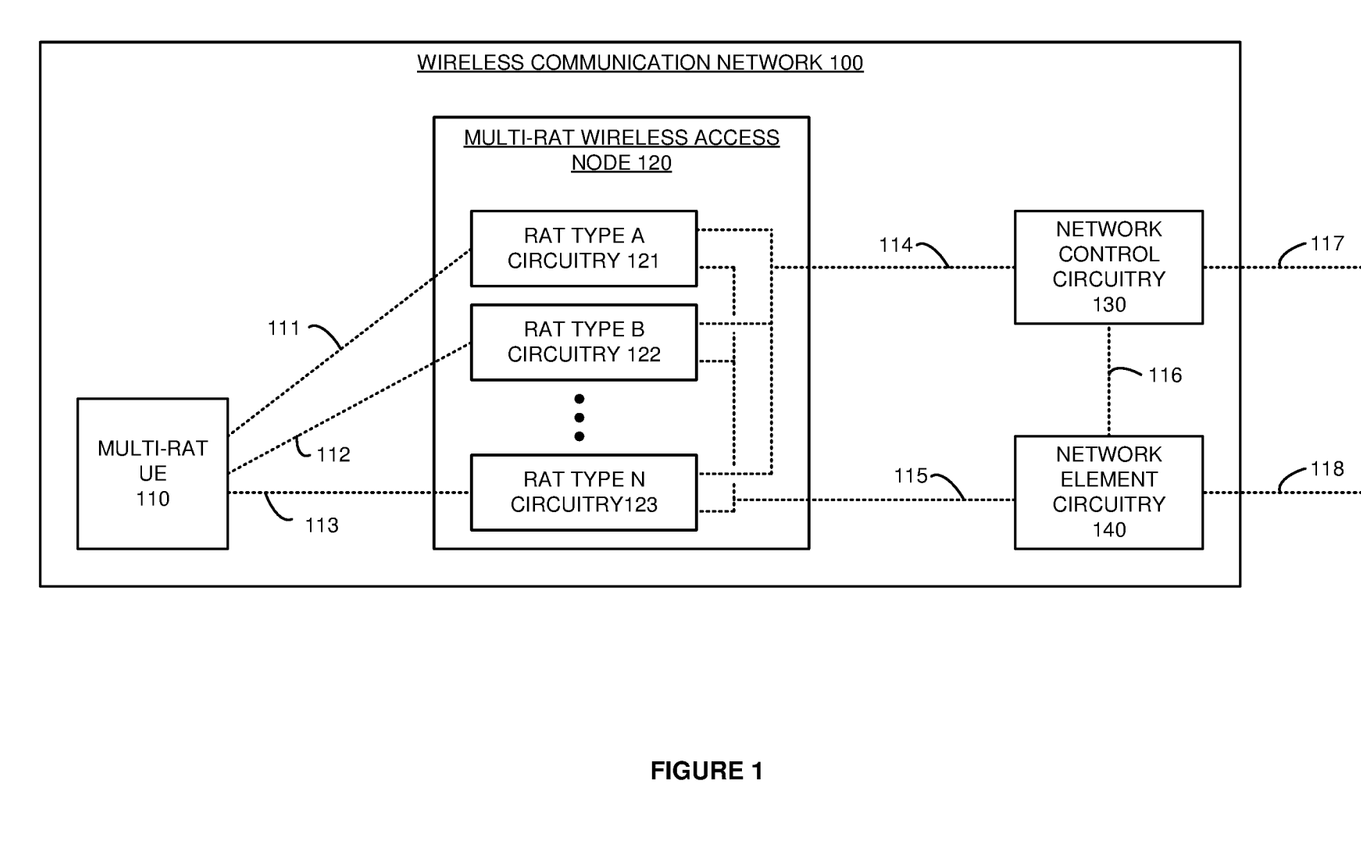
FIG. 1 illustrates a wireless communication network to serve Multiple Radio Access Technology User Equipment (multi-RAT UE) over multiple wireless connections using multiple RAT types.

FIG. 1 illustrates wireless communication network 100 to serve Multiple Radio Access Technology User Equipment (multi-RAT UE) 110 with data communication services over multiple wireless connections using multiple RAT types. Multi-RAT UE 110 comprises a phone, computer, robot, sensor, vehicle, drone, data appliance, or some other user apparatus with wireless communication circuitry. The data communication services comprise media-streaming, machine communications, vehicle control, social-networking, and/or some other user applications. Wireless communication network 100 comprises multi-RAT UE 110, multi-RAT wireless access node 120, network control circuitry 130, and network element circuitry 140. Wireless communication network 100 is restricted for clarity may include many more UEs, access nodes, and RAT types than the number shown.

Multi-RAT wireless access node 120 comprises RAT type A circuitry 121, RAT type B circuitry 122, and RAT type N circuitry 123. Multi-RAT UE 110 and RAT circuitry 121-123 are coupled over respective wireless links 111-113. Wireless links 111-113 use frequencies in the low-band, mid-band, millimeter-wave band, and/or some other part of the wireless spectrum. RAT circuitry 121-123 and network control circuitry 130 are coupled over data links 114. RAT circuitry 121-123 and network element circuitry 140 are coupled over data links 115. Network control circuitry 130 is coupled to network element circuitry 140 over data links 116. Network control circuitry 130 and network element circuitry 140 are coupled to external systems over respective data links 117-118. Data links 114-118 may comprise intermediate communication nodes and networks.

RAT types A-N are representative. Exemplary RAT types comprise WIFI, LTE, 5GNR, NB IoT, and/or some other wireless communication protocols. WIFI is a wireless Local Area Network (LAN) that is often used for device networking in homes, offices, business, and the like. WIFI is described in IEEE 802.11. LTE is an Orthogonal Frequency Division Multiplex (OFDM) Wide Area Network (WAN) radio technology that serves mobile devices with internet and voice services. LTE is described by the Third Generation Partnership Project (3GPP) Technical Specification (TS) 36. 5GNR is an OFDM WAN radio technology that provides an extension to LTE. 5GNR is described in 3GPP TS 38. NB IoT is a Low-Power (LP) WAN radio technology that uses narrow frequency channels to restrict power while retaining long range. NB IoT is described in 3GPP Release 13.

RAT circuitry 121-123 comprises antennas, modulators, amplifiers, filters, digital/analog interfaces, microprocessors, memory, software, transceivers, and bus connections. RAT circuitry 121-123 may share some of these components. The microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memory comprises Random Access Memory (RAM), flash circuitry, disk drives, and/or the like. The memory stores software like operating systems and network applications. Exemplary network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP), although other network applications could be used. The microprocessors execute the operating systems and network applications to wirelessly exchange network signaling and user data with multi-RAT UE 110 over wireless links 111-113. The microprocessors execute the operating systems and network applications to exchange network signaling and user data with network control circuitry 130 and network element circuitry 140 over data links 114-115.

Network control circuitry 130 and network element circuitry 140 comprise microprocessors, memories, software, transceivers, and bus connections. The microprocessors comprise DSPs, CPUs, GPUs, FPGAs, ASICs, and/or the like. The memories comprises RAM, flash circuitry, disk drives, and/or the like. The memories store software like operating systems, virtual components, and network functions. The virtual components comprise hypervisors, virtual switches, virtual machines, and/or some other virtualization middleware. Exemplary network functions comprise Mobility Management Entity (MME), Home Subscriber System (HSS), Serving Gateway (SGW), Packet Data Network Gateway (PGW), Policy, Charging, and Rules Function (PCRF), Access and Mobility Management Function (AMF), Session Management Function (SMF), Policy Control Function (PCF), User Plane Function (UPF), and/or some other networking software.

Multi-RAT wireless access node 120 wirelessly transfers network information indicating available RAT types. For example, wireless access node 120 may broadcast System Information Blocks (SIBs) that list its available RAT types. Multi-RAT UE 110 receives the network information and selects its own "UE-selected" RAT types from the list of available RAT types. For example, wireless access node 120 may store data indicating its RAT capabilities and select the available RAT types that correspond to its own RAT capabilities.

Multi-RAT UE 110 transfers attachment signaling to multi-RAT wireless access node 120 indicating the UE-selected RAT types. For example, multi-RAT UE 110 may transfer Radio Resource Control (RRC) connection set-up signaling to wireless access node 120 that lists the UE-selected RAT types. Multi-RAT wireless access node 120 wirelessly receives attachment signaling from multi-RAT UE 110 indicating the UE-selected RAT types. In response, multi-RAT wireless access node 120 transfers request signaling to network control circuitry 130 indicating the UE-selected RAT types. For example, wireless access node 120 may transfer an Initial Context Set-up Request message indicating the UE-selected RAT types.

Network control circuitry 130 processes the request signaling and selects "network-selected" RAT types from the UE-selected RAT types. For example, network control circuitry 130 may host a data structure that correlates an ID for multi-RAT UE 110 to one or more Access Point Names (APNs) and that correlates the APNs to a prioritized list of RAT types. Network control circuitry 130 may then select the RAT types that are yielded by the data structure which are also UE-selected RAT types. Network control circuitry 130 transfers response signaling to multi-RAT wireless access node 120 indicating the network-selected RAT types for multi-RAT UE 110 along with data throughput values. For example, network control circuitry 130 may transfer an Initial Context Set-up Request message to wireless access node 120 that indicates the network-selected RAT types and data throughput values.

Multi-RAT wireless access node 120 receives the response signaling and responsively transfers connection signaling to multi-RAT UE 110 that indicates the network-selected RAT types to use over wireless link 111-113. For example, network control circuitry 130 may transfer RRC Connection Reconfiguration Request messages to UE 110 that indicates the network-selected RAT types and wireless links 111-113. In response, multi-RAT UE 110 and multi-RAT wireless access node 120 simultaneously exchange user data over the wireless links 111-113 using the network-selected RAT types.

Figure 2:
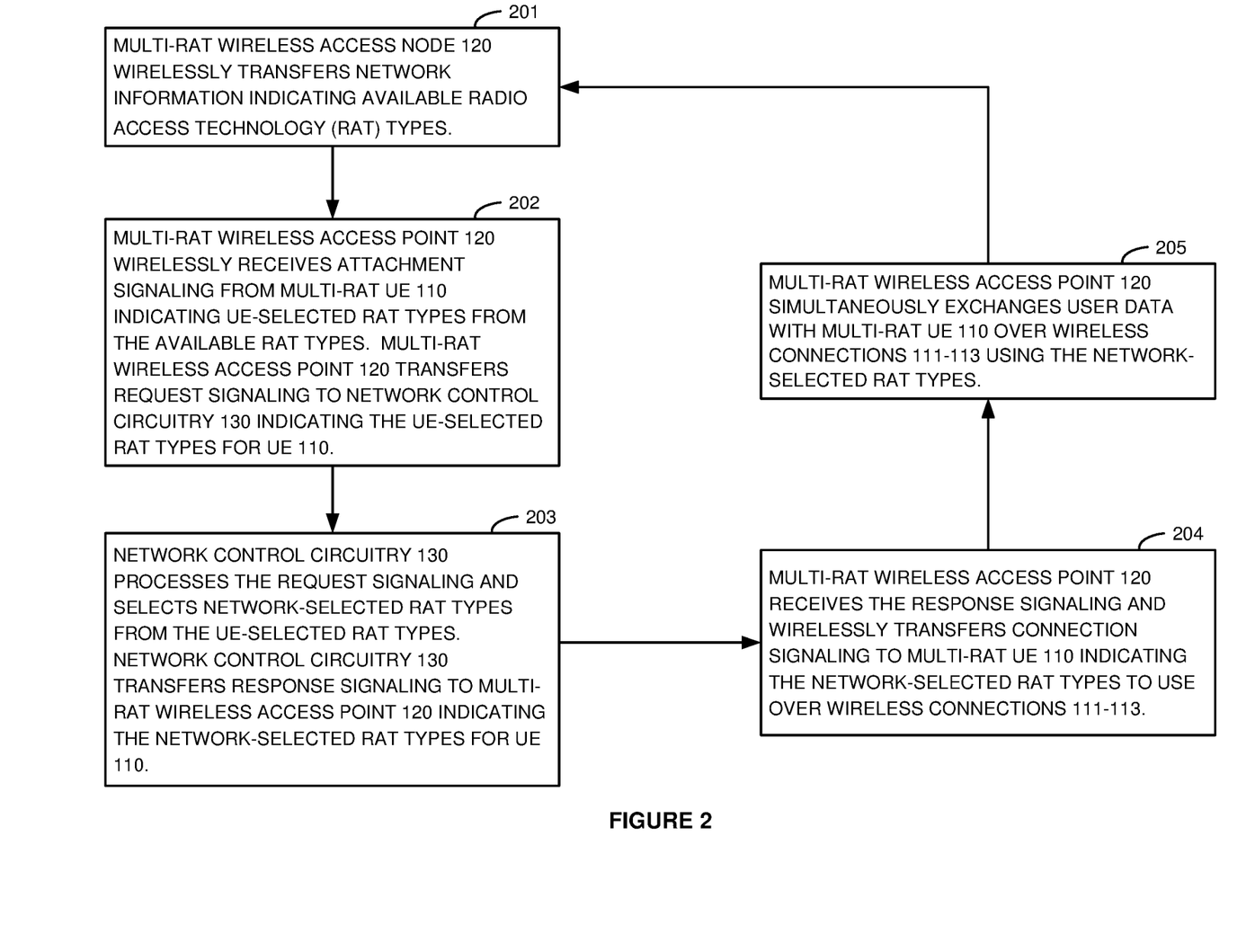
FIG. 2 illustrates the operation of the wireless communication network to serve the multi-RAT UE over multiple wireless connections using multiple RAT types.

FIG. 2 illustrates the operation of wireless communication network 100 to serve multi-RAT UE 110 over multiple wireless connections using multiple RAT types. Multi-RAT wireless access node 120 wirelessly transfers network information indicating the available RAT types to multi-RAT UE 110 (201). Multi-RAT wireless access node 120 wirelessly receives attachment signaling from multi-RAT UE 110 indicating UE-selected RAT types that were selected by UE 110 from the available RAT types (202). Multi-RAT wireless access node 120 transfers request signaling to network control circuitry 130 indicating the UE-selected RAT types (202).

Network control circuitry 130 processes the request signaling and selects "network-selected" RAT types from the UE-selected RAT types (203). For example, a Mobility Management Entity (MME) may access a Home Subscriber System (HSS) that translates a Public Land Mobile Network (PLMN) ID into an APN and then translates the APN into a list of RAT types to match against the UE-selected RAT types.

Network control circuitry 130 transfers response signaling to multi-RAT wireless access node 120 indicating the network-selected RAT types for multi-RAT UE 110 (203). Multi-RAT wireless access node 120 receives the response signaling and responsively transfers connection signaling to multi-RAT UE 110 that indicates the network-selected RAT types to use over wireless links 111-113 (204). Multi-RAT UE 110 and multi-RAT wireless access node 120 simultaneously exchange user data over the wireless links 111-113 using the network-selected RAT types (205). The operation repeats (201).

Figure 3:
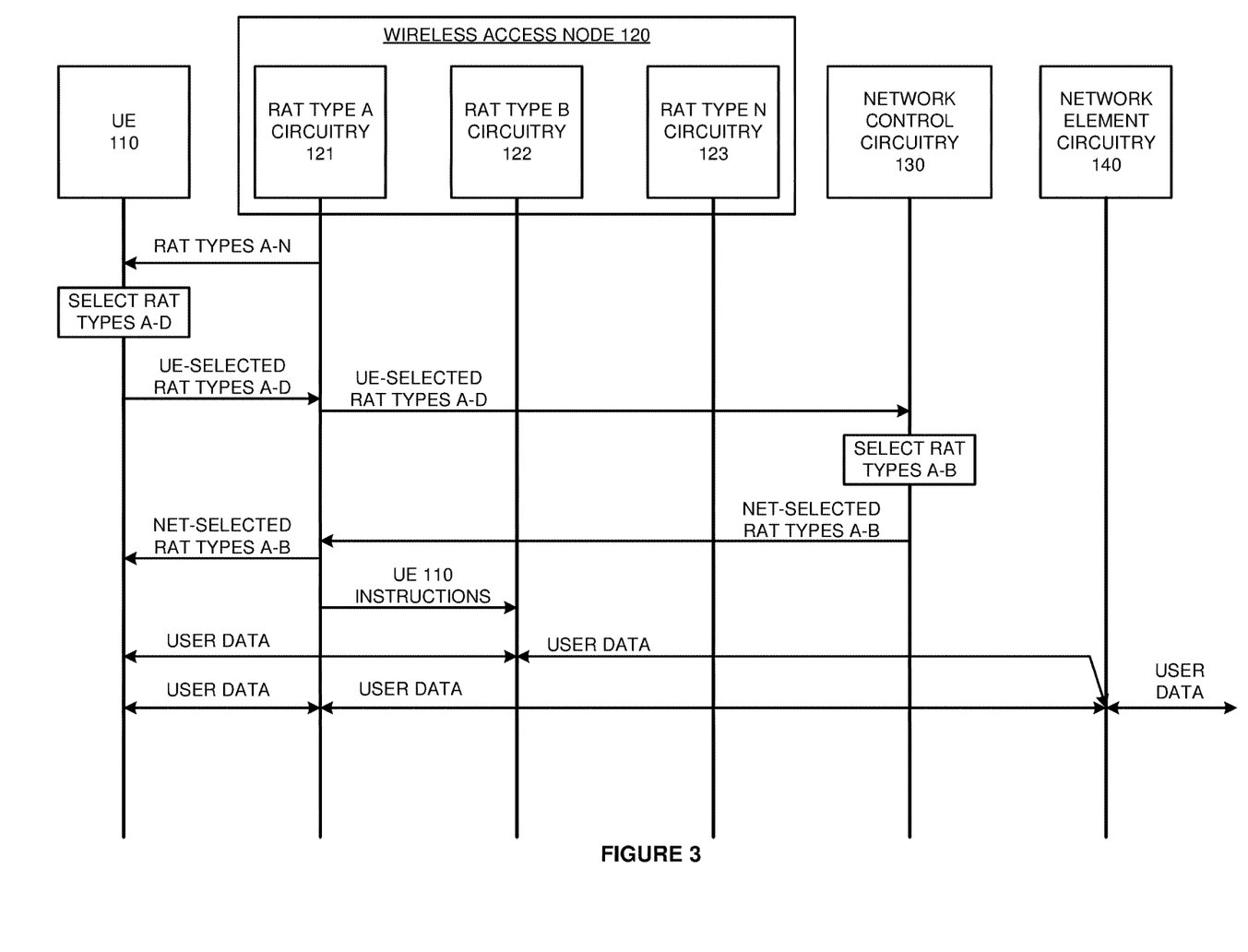
FIG. 3 illustrates the operation of the wireless communication network to serve the multi-RAT UE over multiple wireless connections using multiple RAT types.

FIG. 3 illustrates the operation of wireless communication network 100 to serve multi-RAT UE 110 over multiple wireless connections using multiple RAT types. Multi-RAT wireless access node 120 wirelessly transfers network information indicating available RAT types A-N. Multi-RAT UE 110 selects "UE-selected" RAT types A-D from the available RAT types A-N. Multi-RAT UE 110 transfers attachment signaling to multi-RAT wireless access node 120 indicating the UE-selected RAT types A-D. Multi-RAT wireless access node 120 wirelessly receives attachment signaling from multi-RAT UE 110 indicating the UE-selected RAT types A-D. In response, multi-RAT wireless access node 120 transfers request signaling to network control circuitry 130 indicating the UE-selected RAT types A-D.

Network control circuitry 130 processes the request signaling and selects "network-selected" RAT types A-B from the UE-selected RAT types A-D. Network control circuitry 130 transfers response signaling to multi-RAT wireless access node 120 indicating the network-selected RAT types A-B for multi-RAT UE 110. Multi-RAT wireless access node 120 wirelessly transfers connection signaling to multi-RAT UE 110 that indicates the network-selected RAT types A-B to use over wireless links 111-112. Multi-RAT UE 110 and RAT type A circuitry 121 exchange user data over wireless link 111 using RAT type A, and simultaneously, multi-RAT UE 110 and RAT type B circuitry 122 exchange user data over wireless link 112 using RAT type B. RAT circuitry 121-122 exchange the user data with network element circuitry 140. Network element circuitry 140 exchanges the user data with external systems and performs data aggregation/separation.

Figure 4:
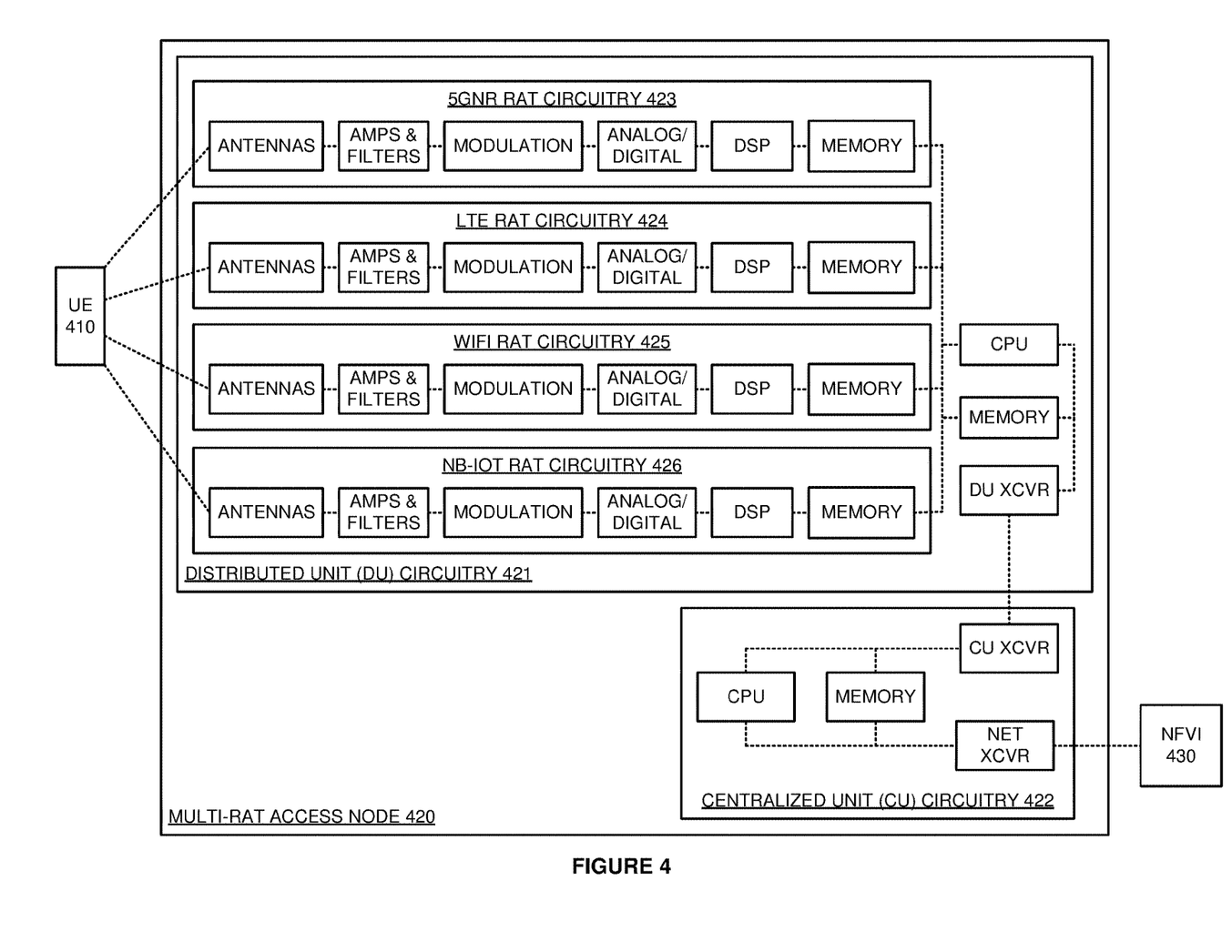
FIG. 4 illustrates a multi-RAT access node to serve a multi-RAT UE over multiple wireless connections using multiple RAT types.

FIG. 4 illustrates multi-RAT access node 420 to serve multi-RAT UE 410 over multiple wireless connections using multiple RAT types. Multi-RAT access node 420 is an example of wireless access node 120, although node 120 may differ. Multi-RAT access node 420 comprises Distributed Unit (DU) circuitry 421 and Centralized Unit (CU) circuitry 422. DU circuitry 421 comprises 5GNR RAT circuitry 423, LTE RAT circuitry 424, WIFI RAT circuitry 425, and NB-IoT RAT circuitry 426. DU circuitry 421 further comprises Central Processing Units (CPU), memory, and transceivers (DU XCVR). The CPU, memory, transceiver, and RAT circuitry 423-426 are coupled over bus circuitry. RAT circuitry 423-246 comprises antennas, amplifiers (AMPS), filters, modulation, analog-to-digital interfaces, Digital Signal Processors (DSP), and memory that are coupled over bus circuitry. CU circuitry 422 comprises CPU, memory, and transceivers that are coupled over bus circuitry. Multi-RAT UE 410 is coupled to the antennas in RAT circuitry 423-426 over wireless links. The DU transceivers in DU circuitry 421 are coupled to the CU transceivers in CU circuitry 422 over data links. The network transceivers in CU circuitry 422 are coupled to Network Function Virtualization Infrastructure (NFVI) 430 over data links.

In DU circuitry 421, the memories store operating systems and network applications. The network applications may include at least some of: Physical Layer (PHY), Media Access Control (MAC), Radio Link Control (RLC), Packet Data Convergence Protocol (PDCP), Radio Resource Control (RRC), and Service Data Adaptation Protocol (SDAP). In CU circuitry 422, the memories store operating systems, virtual components, and network applications. The virtual layer components comprise hypervisor modules, virtual switches, virtual machines, and/or the like. The network applications comprise at least some of PHY, MAC, RLC, PDCP, RRC, and SDAP. The CPU in DU circuitry 421 may execute some or all of the network applications to drive the exchange of network signaling and user data between UE 410 and CU circuitry 422 over RAT circuitry 423-426. The CPU in CU circuitry 422 may execute some or all of the network applications to drive the exchange of network signaling and user data between DU circuitry 421 and NFVI 430. The functionality split of the network applications between DU circuitry 421 and CU circuitry 422 may vary.

In RAT circuitry 423-426, the antennas receive wireless signals from multi-RAT UE 410 that transport Uplink (UL) network signaling and user data from UE 410. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSPs. The DSP recovers UL symbols from the UL digital signals. In DU circuitry 421 and/or CU circuitry 422, the CPUs execute the network applications to process the UL symbols and recover the UL network signaling and user data.

In CU circuitry 422, the network transceivers receive Downlink (DL) network signaling and user data from NFVI 430 and transfer the DL network signaling and user data to memory. In DU circuitry 421 and/or CU circuitry 422, the CPUs execute the network applications to process the UL/DL network signaling and user data to generate UL network signaling and user data and DL symbols that carry DL network signaling and user data. In DU circuitry 421, the DSPs process DL symbols to generate corresponding digital signals for the analog-to-digital interfaces.

In DU circuitry 421, the analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless signals that transport the DL network signaling and user data to multi-RAT UE 410.

The SDAP and RRC map between network signaling/user data and Service Data Units (SDUs). The SDAP and RRC exchange their SDUs with the PDCP. The PDCP maps between the SDUs and PDUs. The PDCP exchanges the PDUs with the RLC. The RLC maps between the PDUs and MAC logical channels. The 5GNR RLC exchanges the network signaling and user data with the 5GNR MAC over the MAC logical channels. The 5GNR MAC maps between the MAC logical channels and MAC transport channels. The 5GNR MAC exchanges the network signaling and user data with the 5GNR PHY over the MAC transport channels. The 5GNR PHY maps between the MAC transport channels and PHY transport channels. 5GNR PHY exchanges the network signaling and user data with the 5GNR PHYs in the multi-RAT UE 410 over the PHY transport channels in the wireless links.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In particular, the LTE and/or 5GNR RRC broadcasts System Information Blocks (SIBs) that list available RAT types. In this example, the available RAT types comprise 5GNR, LTE, WIFI, and NB-IoT—although other RAT types could be used. The LTE or 5GNR RRC receives network signaling from UE 410 that indicates available RAT types that were selected by UE 410 (the UE-selected RAT types). In this example, UE 410 selects the 5GNR, LTE, and NB-IoT RAT types. In response, the LTE and/or 5GNR RRC transfers request signaling to a Mobility Management Entity (MME) or Access and Mobility Function (AMF) in NFVI 430 that indicates the UE-selected RAT types (5GNR, LTE, NB-IoT).

The MME or AMF select "network-selected" RAT types from the UE-selected RAT types. For example, the MME may access an HSS with data like Public Land Mobile Network (PLMN) ID and UE category type to yield and Access Point Name (APN), and then the HSS could translate the APN into the network selected RAT types. The UE category type is typically a numerical value from 1-20 or more for the uplink and downlink that specify various metrics for the UE like data rate, antenna rank, coding, and the like. In another example, the AMF may access a Network Slice Selection Function (NSSF) with data like UE ID to yield a slice ID, and a PCF could translate the slice ID into the network selected RAT types. In this example, 5GNR, LTE, and NB-IoT are the network-selected RAT types—the same as the UE-selected RAT types. In other examples, not all of the UE-selected RAT types are selected to be network-selected RAT types.

The MME or AMF in NFVI 430 transfers response signaling to the LTE or 5GNR RRC in multi-RAT wireless access node 420 indicating the network-selected RAT types for multi-RAT UE 410. The LTE or 5GNR RRC in multi-RAT wireless access node 420 transfers connection signaling to multi-RAT UE 410 that indicates the network-selected RAT types (5GNR, LTE, and NB-IoT) to use over the wireless links. The LTE or 5GNR RRC in multi-RAT wireless access node 420 configures its network applications to serve UE 410. The LTE or 5GNR RRC in multi-RAT wireless access node 420 signals the network applications in the other network selected RAT types to serve UE 410. In response, multi-RAT UE 410 and RAT circuitry 423, 424, and 426 simultaneously exchange network signaling and user data over the wireless links using the network-selected RAT types (5GNR, LTE, IoT). The 5GNR or LTE RRC exchanges network signaling and user data with an SGW or UPF in NFVI 430.

Figure 5:
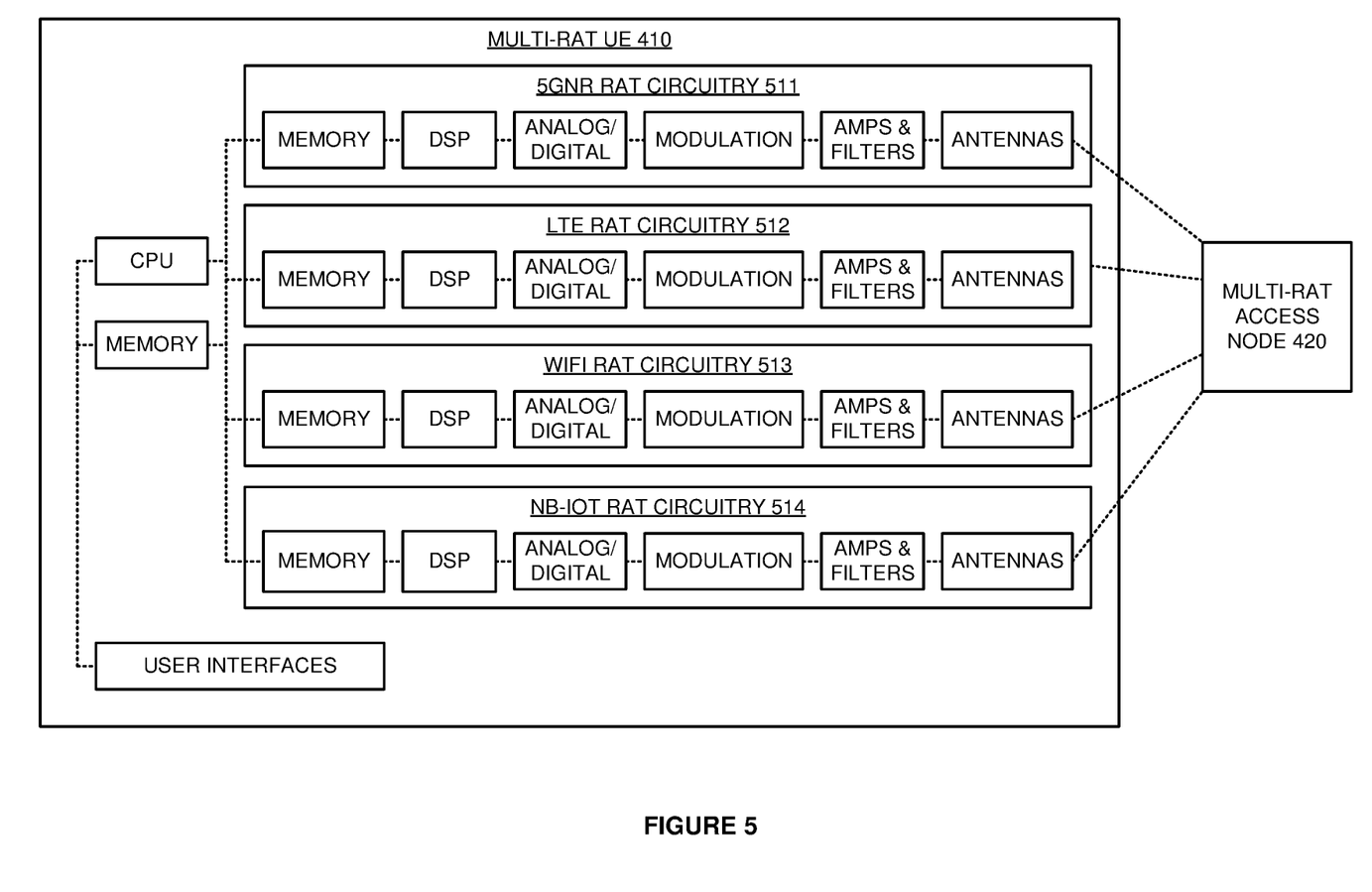
FIG. 5 illustrates a Network Function Virtualization Infrastructure (NFVI) to serve the multi-RAT UE over the multi-RAT access node and multiple wireless connections using multiple RAT types.

FIG. 5 illustrates multi-RAT UE 410 that is served by multi-RAT access node 420 over multiple wireless connections using multiple RAT types. 5GNR UE 410 is an example of UE 110, although UE 110 may differ. Multi-RAT UE 410 comprises RAT circuitry 511-514, CU, memory, user interfaces, and transceiver which are interconnected over bus circuitry. RAT circuitry 511-514 comprises 5GNR RAT circuitry 511, LTE RAT circuitry 512, WIFI RAT circuitry 513, and NB-IoT RAT circuitry 514. RAT circuitry 511-514 comprises antennas, amplifiers, filters, modulation, analog-to-digital interfaces, DSP, and memory that are coupled over bus circuitry. The antennas in multi-RAT UE 410 are coupled to multi-RAT access node 420 over wireless links. The user interfaces comprise graphic displays, machine controllers, sensors, cameras, transceivers, and/or some other user components. The memories store operating systems, user applications, and network applications. The network applications comprise PHY, MAC, RLC, PDCP, RRC, and SDAP. The CPU executes the operating systems, user applications, and network applications to exchange network signaling and user data with multi-RAT access node 420 over RAT circuitry 511-514 and the wireless links.

In particular, the LTE or 5GNR RRC receives System Information Blocks (SIBs) that list the available RAT types (5GNR, LTE, WIFI, NB-IoT). The LTE or 5GNR RRC receives the SIBs selects "UE-selected' RAT types from the available RAT types. For example, UE 410 may store data indicating its RAT capabilities and select the available RAT types that correspond to its own RAT capabilities. In this example, UE 410 selects 5GNR, LTE, and NB-IoT. The LTE or 5GNR RRC transfers attachment signaling to multi-RAT wireless access node 420 indicating the UE-selected RAT types.

The LTE or 5GNR RRC receives connection signaling that indicates the network-selected RAT types to use over the wireless links. In this example, the network-selected RAT types and the UE-selected RAT types are the same. The LTE or 5GNR RRC in UE 410 configures its network applications to communicate with their RAT type in multi-RAT access node 420. The LTE or 5GNR RRC in UE 410 signals the network applications in the other network selected RAT types to communicate with multi-RAT access node 420. RAT circuitry 511, 512, and 514 and respective RAT circuitry 423, 424, and 426 simultaneously exchange network signaling and user data over the wireless links using the network-selected RAT types (5GNR, LTE, IoT).

Figure 6:
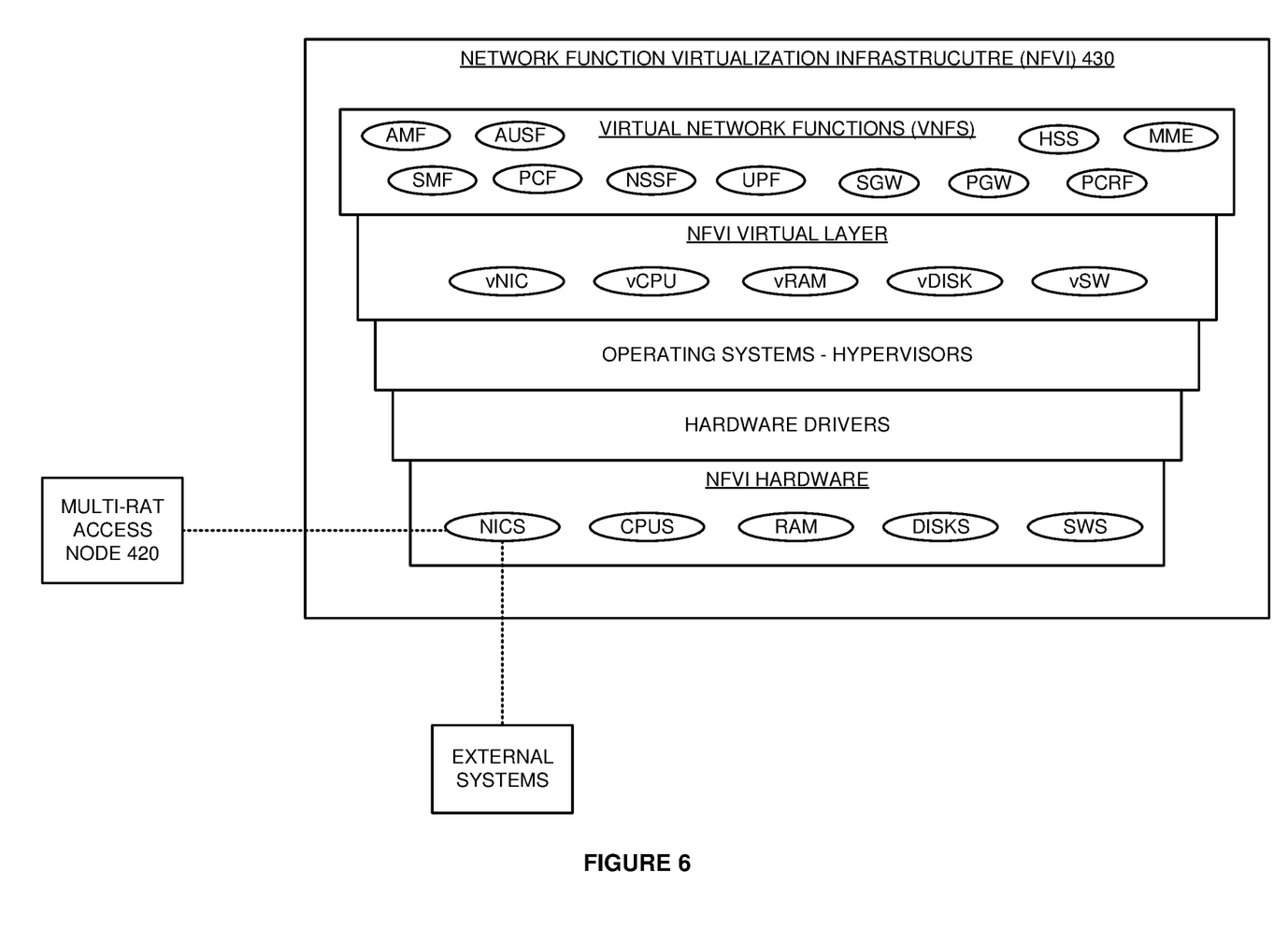
FIG. 6 illustrates the multi-RAT UE served by the multi-RAT access node over multiple wireless connections using multiple RAT types.

FIG. 6 illustrates Network Function Virtualization Infrastructure (NFVI) 430 to serve multi-RAT UE 410 over multi-RAT access node 420 and multiple wireless connections using multiple RAT types. NFVI 430 is an example of network control circuitry 130 and network element circuitry 140, although network circuitry 130 and 140 may differ. NFVI 430 comprises NFVI hardware, hardware drivers, operating systems and hypervisors, NFVI virtual layer, and Virtual Network Functions (VNFs).

The NFVI hardware comprises Network Interface cards (NICs), CPUs, RAM, disk storage, and data switches. The virtual layers comprise virtual NICs (vNIC), virtual CPUs (vCPU), virtual RAM (vRAM), virtual Disk Storage (vDISK), and virtual Switches (vSW). The VNFs comprise wireless network elements like Access and Mobility Management Function (AMF) VNF, Session Management Function (SMF) VNF, Policy Control Function (PCF) VNF, Authentication and Security Function (AUSF) VNF, User Plane Function (UPF) VNF, Mobility Management Entity (MME) VNF, Home Subscriber System (HSS) VNF, Serving Gateway (SGW) VNF, Packet Data Network Gateway (PGW) VNF, Policy Charging Rules Function (PCRF) VNF, or some other networking system. The NFVI hardware executes the hardware drivers, operating systems/hypervisors, virtual layers, and VNFs to serve the multi-RAT UE 410 over the multi-RAT access node 420.

In some examples, the MME VNF receives attachment signaling like an S1-MME initial UE message for UE 410 that indicates UE ID, UE-selected RATs, UE application, UE location, UE Public Land Mobile Network (PLMN), and/or some other networking data. The MME VNF exchanges Non-Access Stratum (NAS) data with UE 410 over access node 420 and performs UE authentication and UE security. The MME VNF transfers a database request like an Update Location Request to the HSS VNF that indicates UE ID, UE-selected RAT types, UE application, UE location, UE PLMN, and/or some other networking data. The HSS VNF selects the network-selected RAT types from the UE-selected RAT types based on the UE ID, application, location, PLMN, and/or other data. The HSS VNF also yields one or more Access Point Names (APNs). The HSS VNF may select the APN(s) first and then use the APNs to select the network-selected RAT types. The HSS VNF may select the RAT types first and then use the RAT types to select the APN(s). In this example, the HSS VNF selects RAT types 5GNR, LTE, and NB-IoT.

The MME VNF exchanges signaling with the SGW VNF which exchanges signaling with the PGW VNF. The PGW VNF exchanges signaling with a PCRF VNF that indicates UE ID, network-selected RAT types, UE application, UE location, UE PLMN, and/or some other networking data. The PCRF VNF selects one or more Quality-of-Service Class Indicators (QCIs) based on the signaling, and selected QCIs are transferred back to the MME VNF over the PGW VNF and SGW VNF. The MME VNF transfers response signaling like an Initial Context Set-up Request to multi-RAT access node 420 that indicates the network-selected RATs, APNs, QCIs, and other pertinent data. The MME VNF receives connection signaling from UE 410 and access node 420 like Attach Complete and Bearer Accept NAS messages, and in response, the MME VNF directs the SGW VNF to modify a bearer that serves UE 410. The SGW VNF and the PGW VNF exchange user data with multi-RAT UE 410 over multi-RAT access node 420.

In other examples, the AMF VNF receives attachment signaling like an N2 UE message for UE 410 that indicates UE ID, UE-selected RATs, UE application, UE location, UE PLMN, and/or some other networking data. The AMF VNF exchanges N1 data with UE 410 over access node 420 and performs UE authentication and UE security. The AMF VNF transfers the UE data to the SMF VNF. The AMF VNF transfers database requests to the AUSF VNF, NSSF VNF, and PCF VNF that indicate UE ID, UE-selected RAT types, UE application, UE location, UE PLMN, and/or some other networking data. One of the VNFs (AMF, SMF, AUSF, NSSF, PCF) selects network-selected RAT types from the UE-selected RAT types based on the UE data. The VNFs may first select data like network slice ID, service name, or Quality-of-Service (QoS) level, and then use the network slice ID, service name, and/or QoS level to select the RAT types. In this example, the VNFs select RAT types 5GNR, LTE, and NB-IoT. The AMF VNF transfers N2 signaling to multi-RAT access node 420 that indicates the network-selected RAT types, QoS levels, and other pertinent data. The AMF VNF receives connection signaling from UE 410 and access node 420, and in response, the SMF VNF directs the UPF VNF to modify a bearer that serves UE 410. The UPF VNF exchanges user data with multi-RAT UE 410 over multi-RAT access node 420.

Figure 7:
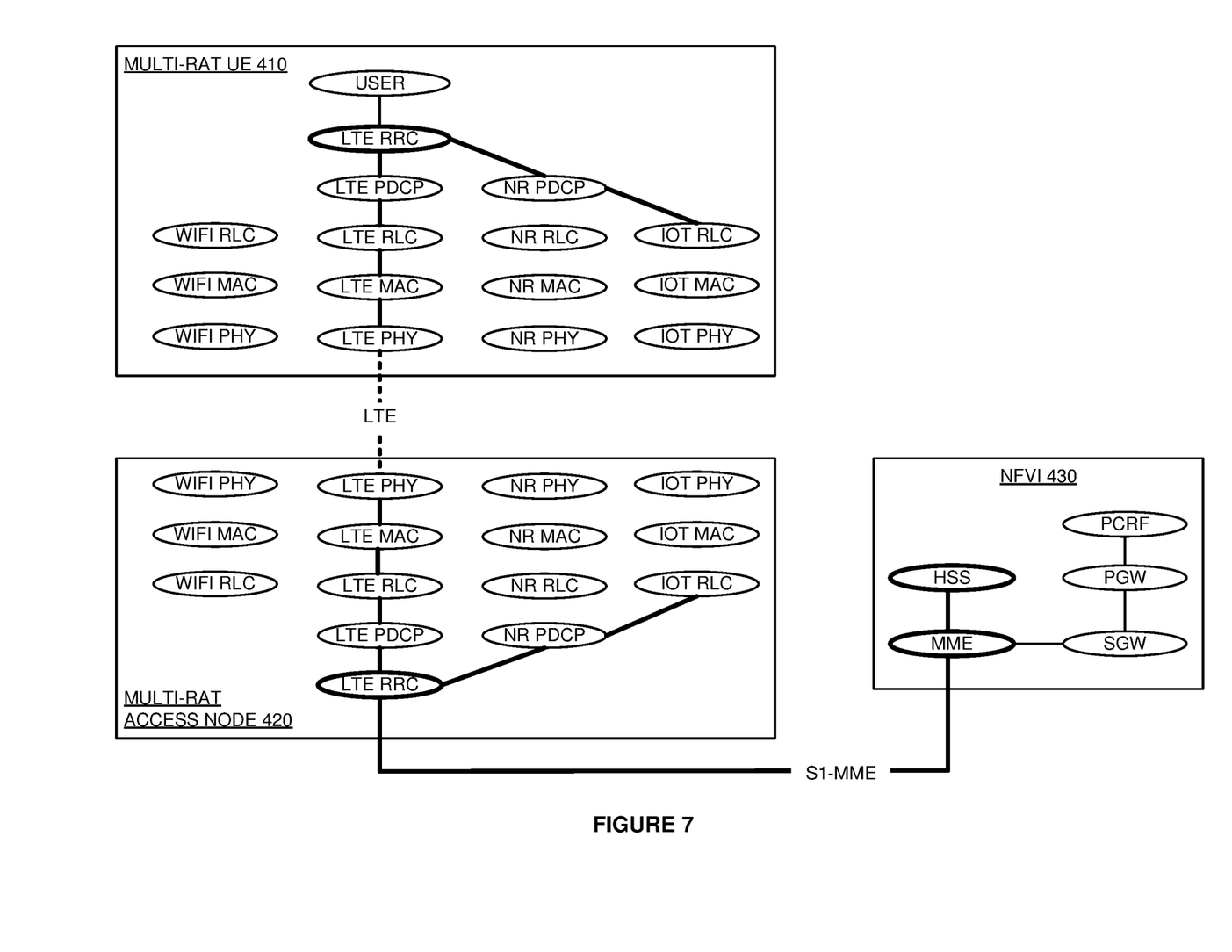
FIG. 7 illustrates the operation of the multi-RAT access node and NFVI to serve the multi-RAT UE over multiple wireless connections using multiple RAT types.
Figure 8:
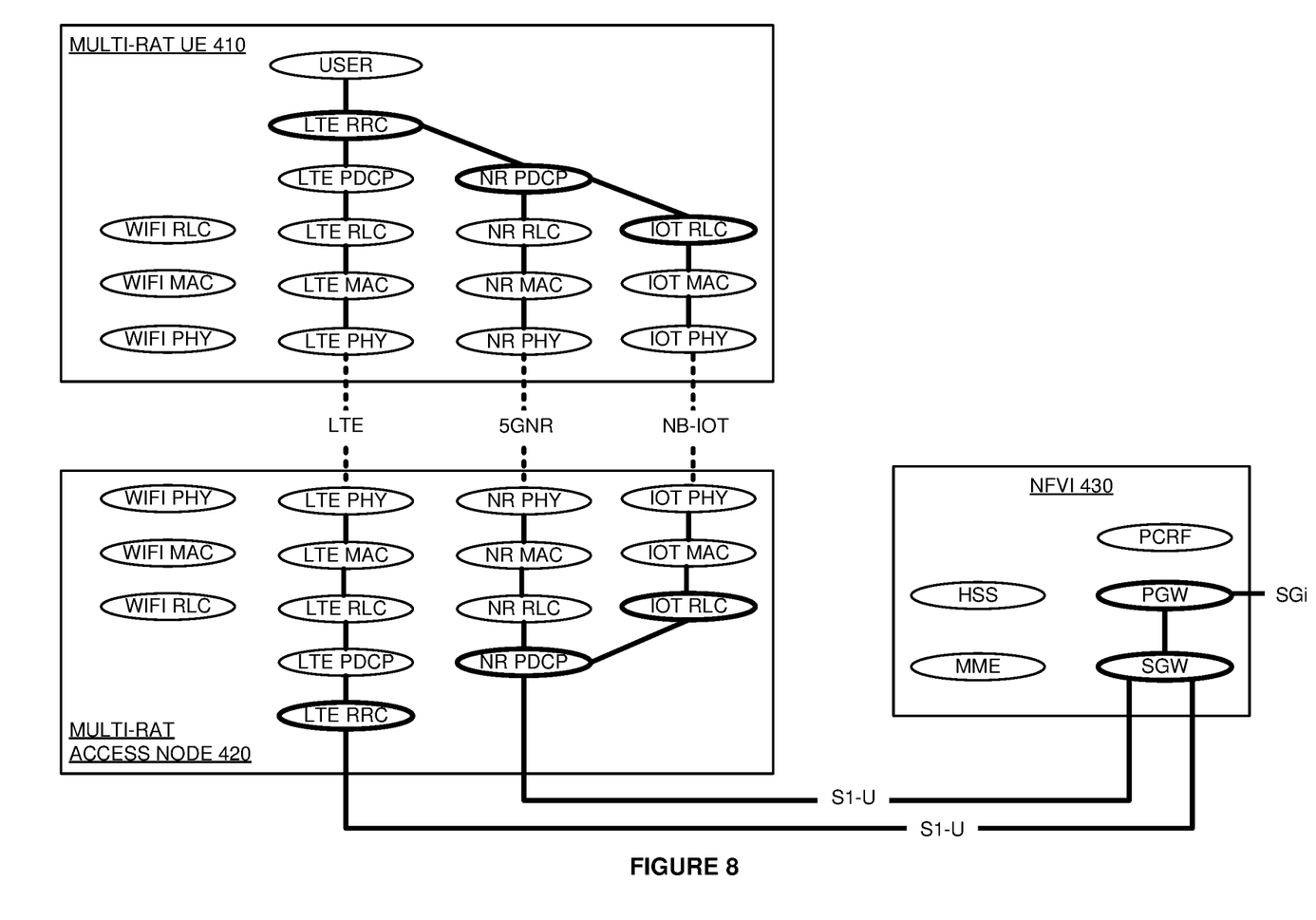
FIG. 8 illustrates the operation of the multi-RAT access node and NFVI to serve the multi-RAT UE over multiple wireless connections using multiple RAT types.

FIGS. 7-8 illustrate the operation of multi-RAT access node 420 and NFVI 430 to serve multi-RAT UE 410 over multiple wireless connections using multiple RAT types. Referring to FIG. 7, the LTE RRC in multi-RAT access node 420 broadcasts SIBs over its PDCP, RLC, MAC, and PHY. The SIBs list available RAT types, PLMNs, and the like. In this example, the available RAT types comprise 5GNR, LTE, WIFI, and NB-IoT—although other RAT types could be used. The LTE RRC in multi-RAT UE 410 receives the SIBs that list the available RAT types over its LTE PHY, MAC, RLC, and PDCP. The LTE RRC in UE 410 selects UE-selected RAT types from the available RAT types based on UE capabilities, user applications, and/or the like. In this example, UE 410 selects 5GNR, LTE, and NB-IoT but not WIFI.

The LTE RRC in UE 410 and the LTE RRC in access node 420 exchange attachment signaling over their respective PDCP, RLC, MAC, and PHY. The attachment signaling comprises random access and RRC connection signaling. The RRC connection signaling indicates the UE-selected RAT types and may comprise an RRC request message, set-up complete message, NAS messaging, or some other network signaling. The LTE RRC in access node 420 transfers attachment signaling like an Initial UE Message to the MME VNF that indicates the UE-selected RAT types and other UE data.

The MME VNF receives the attachment signaling that indicates UE-selected RAT types and UE data (ID, application, location, PLMN, and/or the like). The MME VNF exchanges Non-Access Stratum (NAS) data with the RRC in UE 410 over access node 420 to perform UE authentication and UE security. The MME VNF transfers a database request like an Update Location Request to the HSS VNF that indicates UE ID, UE-selected RAT types, UE application, UE location, UE PLMN, and/or some other networking data.

The HSS VNF selects the network-selected RAT types from the UE-selected RAT types based on the UE ID, UE application, UE location, UE PLMN, and/or other data. For example, the HSS VNF may host a data structure that translates PLMNs into RAT types for matches against the UE-selected RAT types. The HSS VNF also yields one or more Access Point Names (APNs). The HSS VNF may select the APN(s) first and then use the APNs to select the network-selected RAT types. The HSS VNF may select the RAT types first and then use the RAT types to select the APN(s). In this example, the HSS VNF selects the RAT types 5GNR, LTE, and NB-IoT which happen to be the same as the UE-selected RAT types.

The MME VNF exchanges signaling with the SGW VNF which exchanges signaling with the PGW VNF. The PGW VNF exchanges signaling with the PCRF VNF that indicates the UE ID, network-selected RAT types, UE application, UE location, UE PLMN, and/or some other networking data. The PCRF VNF selects one or more Quality-of-Service Class Indicators (QCIs) based on the signaling, and the selected QCI(s) are transferred back to the MME VNF over the PGW VNF and SGW VNF. The MME VNF transfers response signaling like an Initial Context Set-up Request to the LTE RRC multi-RAT access node 420 that indicates the network-selected RATs, APNs, QCIs, and other pertinent data.

The LTE RRC in access node 420 receives the response signaling and configures its LTE network applications to communicate with UE 410. The LTE RRC in access node 420 transfers connection signaling like an RRC Connection reconfiguration message to the RRC in UE 410 over their respective PDCP, RLC, MAC, and PHY that indicates the LTE RAT type and other connection information. In multi-RAT UE 410, the LTE RRC configures its LTE network applications to communicate with access node 420. The LTE RRC in access node 420 transfers connection signaling to the MME VNF like Attach Complete/Bearer Accept NAS messaging. The MME VNF directs the SGW VNF to modify a bearer that serves UE 410.

The LTE RRC in access node 420 signals the 5GNR PDCP in access node 420 to configure the 5GNR RLC, MAC, and PHY and the IoT RLC to communicate with UE 410. The 5GNR PDCP signals the IoT RLC in access node 420 to configure the IoT MAC and PHY to communicate with UE 410. The IoT RLC configures its MAC and PHY to serve UE 410. The LTE RRC in access node 420 transfers connection signaling like an RRC Connection reconfiguration message to the RRC in UE 410 over their respective PDCP, RLC, MAC, and PHY that indicates the 5GNR and IoT RAT types. The LTE RRC in UE 410 signals the 5GNR PDCP to configure its applications to communicate with access node 420. The 5GNR PDCP in UE 410 signals the IoT RLC in UE 410 to configure its IoT applications to communicate with access node 420.

Referring to FIG. 8, the SGW VNF and the PGW VNF exchange user data for multi-RAT UE 410 with external systems and with the LTE RRC in access node 420. The LTE RRC in access node 420 and the LTE RRC in UE 410 exchange the user data over their respective PDCP, RLC, MAC, and PHY. The SGW VNF exchanges user data for multi-RAT UE 410 with the 5GNR PDCP in access node 420. The 5GNR PDCP in access node 420 and the 5GNR PDCP in UE 410 exchange the user data over their respective RLC, MAC, and PHY. The 5GNR PDCP and the user applications in UE 410 exchange the user data over the LTE RRC. The 5GNR PDCP in access node 420 and the IoT RLC in access node 420 exchange user data. The IoT RLC in access node 420 and the IoT RLC in UE 410 exchange the user data over their respective MAC and PHY. The IoT RLC in UE 410 exchanges the user data with the user applications in UE 410 over the 5GNR PDCP and the LTE RRC.

Figure 9:
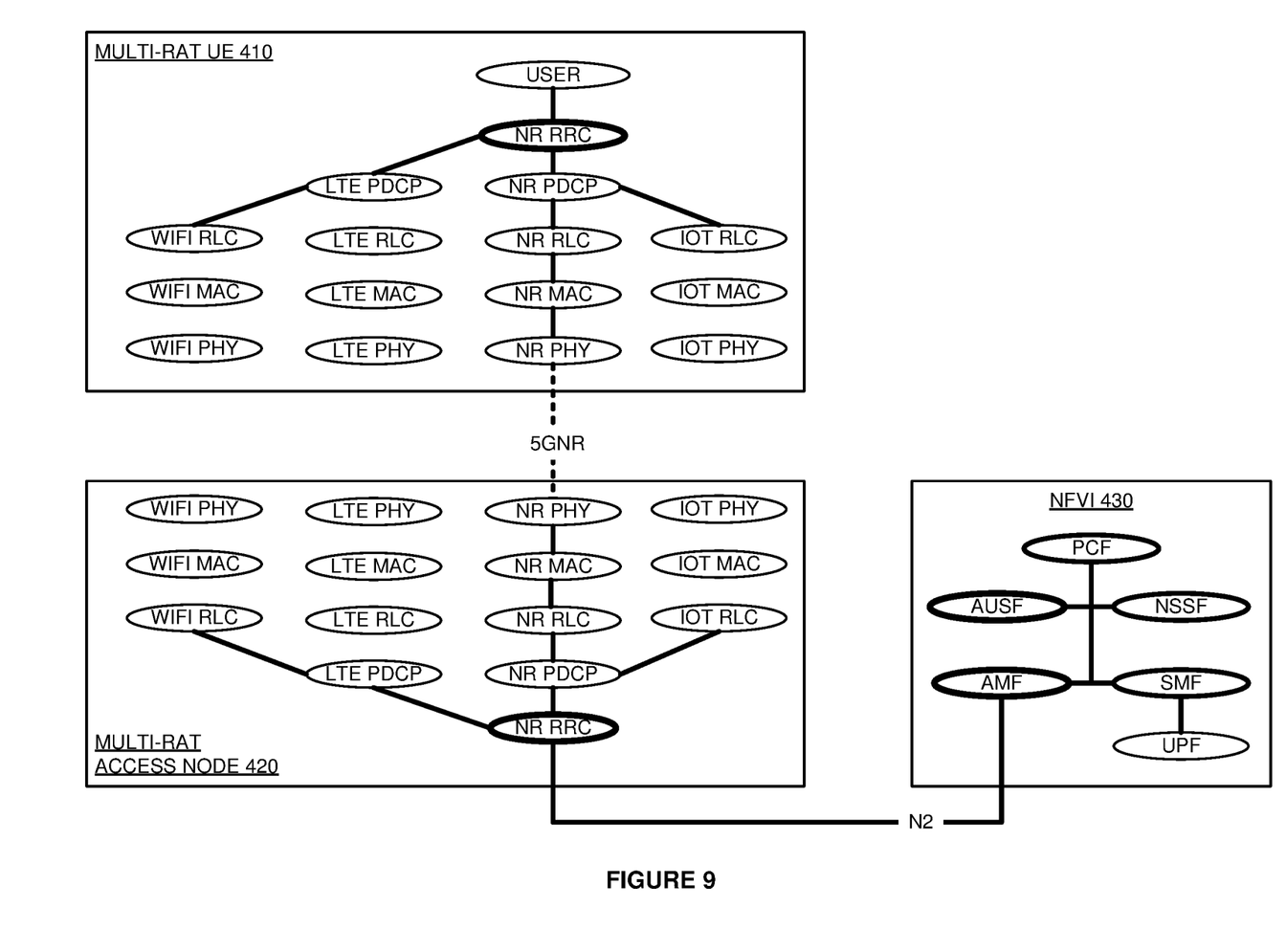
FIG. 9 illustrates the operation of the multi-RAT access node and NFVI to serve the multi-RAT UE over multiple wireless connections using multiple RAT types.
Figure 10:
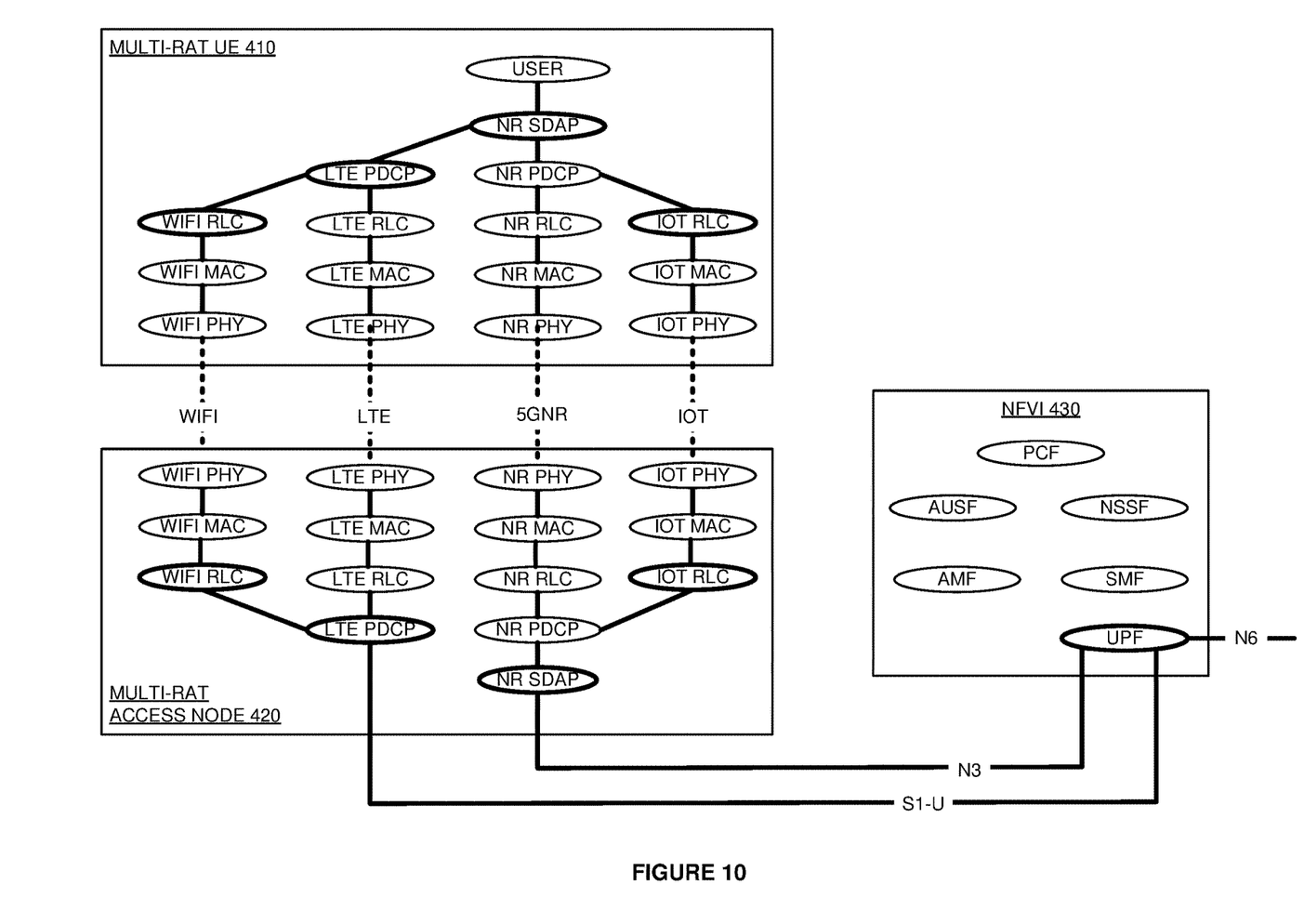
FIG. 10 illustrates the operation of the multi-RAT access node and NFVI to serve the multi-RAT UE over multiple wireless connections using multiple RAT types.

FIGS. 9-10 illustrate an alternative operation of multi-RAT access node 420 and NFVI 430 to serve multi-RAT UE 410 over multiple wireless connections using multiple RAT types. Referring to FIG. 9, the 5GNR RRC in multi-RAT access node 420 broadcasts SIBs over its PDCP, RLC, MAC, and PHY. The SIBs list available RAT types, PLMNs, and the like. In this example, the available RAT types comprise 5GNR, LTE, WIFI, and NB-IoT—although other RAT types could be used. The 5GNR RRC in multi-RAT UE 410 receives the SIBs that list the available RAT types over its 5GNR PHY, MAC, RLC, and PDCP. The 5GNR RRC in UE 410 selects UE-selected RAT types from the available RAT types based on UE capabilities, user applications, and/or the like. In this example, UE 410 selects 5GNR, LTE, NB-IoT, and WIFI, although a different UE selection could be made.

The 5GNR RRC in UE 410 and the 5GNR RRC in access node 420 exchange attachment signaling over their respective PDCP, RLC, MAC, and PHY. The attachment signaling comprises random access and 5GNR connection signaling. The RRC connection signaling indicates the UE-selected RAT types. The 5GNR RRC in access node 420 transfers attachment signaling to the AMF VNF that indicates the UE-selected RAT types and other UE data.

The AMF VNF receives the attachment signaling that indicates the UE-selected RAT types and UE data (ID, application, location, PLMN, and/or the like). The AMF interacts with the AUSF VNF and exchanges N1 data with the RRC in UE 410 over access node 420 to perform UE authentication and UE security. The AMF VNF transfers session requests for UE 410 to the NSSF VNF, PCF VNF, and SMF VNF that indicate data like UE ID, UE-selected RAT types, UE application, UE location, UE PLMN, and/or some other networking data. The NSSF VNF, PCF VNF, or SMF VNF select network-selected RAT types from the UE-selected RAT types based on the UE ID, UE application, UE location, UE PLMN, and/or other data. For example, the NSSF VNF may select a network slice for UE 410 based on PLMN, the PCF VNF may translate the network slice ID into a Quality-of Service (QoS) level, and the SMF VNF may selected the network-selected RAT types based on the slice ID and QoS level. In this example, the SMF VNF selects the RAT types 5GNR, LTE, WIFI, and NB-IoT. The SMF VNF configures the UPF VNF to serve UE 410 over multi-RAT access node 410 and notifies the AMF VNF. The AMF VNF transfers response signaling to the 5GNR RRC in multi-RAT access node 420 that indicates the network-selected RAT types, slice ID, QoS, and other pertinent data.

The 5GNR RRC in access node 420 receives the response signaling and configures its 5GNR network applications to communicate with UE 410. The 5GNR RRC in access node 420 transfers connection signaling to the RRC in UE 410 over their respective PDCP, RLC, MAC, and PHY that indicates the 5GNR RAT type and other connection information. In multi-RAT UE 410, the 5GNR RRC configures its 5GNR network applications to communicate with access node 420. The 5GNR RRC in access node 420 transfers connection signaling to the AMF VNF like an attach complete/bearer accept N1 messaging. The AMF VNF notifies the SMF VNF which directs the UPF VNF to modify a bearer that serves UE 410.

The 5GNR RRC in access node 420 signals the LTE PDCP in access node 420 to configure the LTE RLC, MAC, and PHY to communicate with UE 410. The 5GNR RRC in access node 420 signals the LTE PDCP in access node 420 to configure the WIFI RLC to communicate with UE 410. The 5GNR RRC in access node 420 signals the IoT RLC in access node 420 to configure the IoT MAC and PHY to communicate with UE 410. The LTE RLC configures its RLC, MAC and PHY to serve UE 410. The IoT RLC configures its MAC and PHY to serve UE 410. The WIFI RLC configures its MAC and PHY to serve UE 410.

The 5GNR RRC access node 420 transfers connection signaling to the RRC in UE 410 over their respective PDCP, RLC, MAC, and PHY that indicates the 5GNR, LTE, WIFI, and IoT RAT types. The 5GNR RRC in UE 410 signals the 5GNR PDCP in UE 410 to configure its applications to communicate with access node 420. The 5GNR RRC in UE 410 signals the LTE PDCP in UE 410 to configure its applications to communicate with access node 420. The 5GNR RRC in UE 410 signals the LTE PDCP in UE 410 to configure the WIFI RLC in UE 410 to communicate with access node 420. The 5GNR PDCP in UE 410 signals the IoT RLC in UE 410 to configure its IoT applications to communicate with access node 420. The LTE RLC configures its RLC, MAC and PHY to communicate with multi-RAT access node 420. The WIFI RLC configures its MAC and PHY to communicate with multi-RAT access node 420. The IoT RLC configures its MAC and PHY to communicate with multi-RAT access node 420.

Referring to FIG. 10, the UPF VNF exchanges user data for multi-RAT UE 410 with external systems and with the 5GNR SDAP in access node 420. The 5GNR SDAP in access node 420 and the 5GNR SDAP in UE 410 exchange the user data over their respective PDCP, RLC, MAC, and PHY. The UPF VNF exchanges user data for multi-RAT UE 410 with the LTE PDCP in access node 420. The LTE PDCP in access node 420 and the LTE PDCP in UE 410 exchange the user data over their respective RLC, MAC, and PHY. The LTE PDCP and the user applications in UE 410 exchange the user data over the 5GNR SDAP. The 5GNR PDCP in access node 420 and the IoT RLC in access node 420 exchange user data. The IoT RLC in access node 420 and the IoT RLC in UE 410 exchange the user data over their respective MAC and PHY. The IoT RLC in UE 410 exchanges the user data with the user applications in UE 410 over the 5GNR PDCP and SDAP.

The wireless data network circuitry described above comprises computer hardware and software that form special-purpose wireless network circuitry to serve wireless UEs over multiple wireless connections using multiple RAT types from the wireless access nodes. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to serve wireless UEs over multiple wireless connections using multiple RAT types from the wireless access nodes.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to wirelessly serve Multiple Radio Access Technology User Equipment (multi-RAT UE), the method comprising:
   a multi-RAT wireless access node wirelessly transferring network information indicating available Radio Access Technology (RAT) types;
   the multi-RAT wireless access node wirelessly receiving attachment signaling from the multi-RAT UE indicating UE-selected ones of the available RAT types and responsively transferring request signaling to network control circuitry indicating the UE-selected ones of the available RAT types;
   the network control circuitry processing the request signaling and selecting a wireless network slice ID for the multi-RAT UE and selecting network-selected ones of the UE-selected ones of the available RAT types based on the wireless network slice ID;
   the network control circuitry responsively transferring response signaling to the multi-RAT wireless access node indicating the network-selected ones of the RAT types for the UE;
   the multi-RAT wireless access node receiving the response signaling and responsively wirelessly transferring connection signaling to the multi-RAT UE the indicating the network-selected ones of the RAT types to use over multiple wireless connections; and
   the multi-RAT wireless access node simultaneously exchanging user data over the multiple wireless connections using the network-selected ones of the RAT types.

2. The method of claim 1 wherein the RAT types comprise Fifth Generation New Radio (5GNR) and Long Term Evolution (LTE).

3. The method of claim 1 wherein the RAT types comprise Fifth Generation New Radio (5GNR), Long Term Evolution (LTE), and Narrowband Internet-of-Things (NB-IoT).

4. The method of claim 1 wherein the RAT types comprise Fifth Generation New Radio (5GNR), Long Term Evolution (LTE), and Wireless Fidelity (WIFI).

5. The method of claim 1 wherein the network control circuitry processing the request signaling and selecting the network-selected ones of the RAT types comprises the network control circuitry selecting one or more Access point names (APNs) for the multi-RAT UE and selecting the network-selected ones of the RAT types based on the one or more APNs.

6. The method of claim 1 wherein the network control circuitry processing the request signaling and selecting the network-selected ones of the RAT types comprises the network control circuitry selecting the network-selected ones of the RAT types based on a UE category type of the multi-RAT UE.

7. The method of claim 1 wherein the multi-RAT wireless access node wirelessly transferring the network information indicating the available RAT types comprises the multi-RAT wireless access node wirelessly broadcasting the network information indicating the available RAT types in a System Information Block (SIB).

8. The method of claim 1 wherein the network control circuitry comprises a Mobility Management Entity (MME) and a Home Subscriber System (HSS).

9. The method of claim 1 wherein the network control circuitry comprises an Access and Mobility Management Function (AMF) and a Session Management Function (SMF).

10. A wireless communication network to wirelessly serve Multiple Radio Access Technology User Equipment (multi-RAT UE), the wireless communication network comprising:
    a multi-RAT wireless access node configured to wirelessly transfer network information indicating available Radio Access Technology (RAT) types;
    the multi-RAT wireless access node configured to wirelessly receive attachment signaling from the multi-RAT UE indicating UE-selected ones of the available RAT types and responsively transfer request signaling to network control circuitry indicating the UE-selected ones of the available RAT types;

the network control circuitry configured to process the request signaling and select a wireless network slice ID for the multi-RAT UE and select network-selected ones of the UE-selected ones of the available RAT types based on the wireless network slice ID;

the network control circuitry configured to responsively transfer response signaling to the multi-RAT wireless access node indicating the network-selected ones of the RAT types for the UE;

the multi-RAT wireless access node configured to receive the response signaling and responsively wirelessly transfer connection signaling to the multi-RAT UE the indicating the network-selected ones of the RAT types to use over multiple wireless connections; and the multi-RAT wireless access node configured to simultaneously exchange user data over the multiple wireless connections using the network-selected ones of the RAT types.

11. The wireless communication network of claim 10 wherein the RAT types comprise Fifth Generation New Radio (5GNR) and Long Term Evolution (LTE).

12. The wireless communication network of claim 10 wherein the RAT types comprise Fifth Generation New Radio (5GNR), Long Term Evolution (LTE), and Narrowband Internet-of-Things (NB-IoT).

13. The wireless communication network of claim 10 wherein the RAT types comprise Fifth Generation New Radio (5GNR), Long Term Evolution (LTE), and Wireless Fidelity (WIFI).

14. The wireless communication network of claim 10 wherein the network control circuitry is configured to select one or more Access point names (APNs) for the multi-RAT UE and select the network-selected ones of the RAT types based on the one or more APNs.

15. The wireless communication network of claim 10 wherein the network control circuitry is configured to select the network-selected ones of the RAT types based on a UE category type of the multi-RAT UE.

16. The wireless communication network of claim 10 wherein the multi-RAT wireless access node is configured to wirelessly broadcast the network information indicating the available RAT types in a System Information Block (SIB).

17. The wireless communication network of claim 10 wherein the network control circuitry comprises a Mobility Management Entity (MME) and a Home Subscriber System (HSS).

18. The wireless communication network of claim 10 wherein the network control circuitry comprises an Access and Mobility Management Function (AMF) and a Session Management Function (SMF).

* * * * *